Patented June 11, 1935

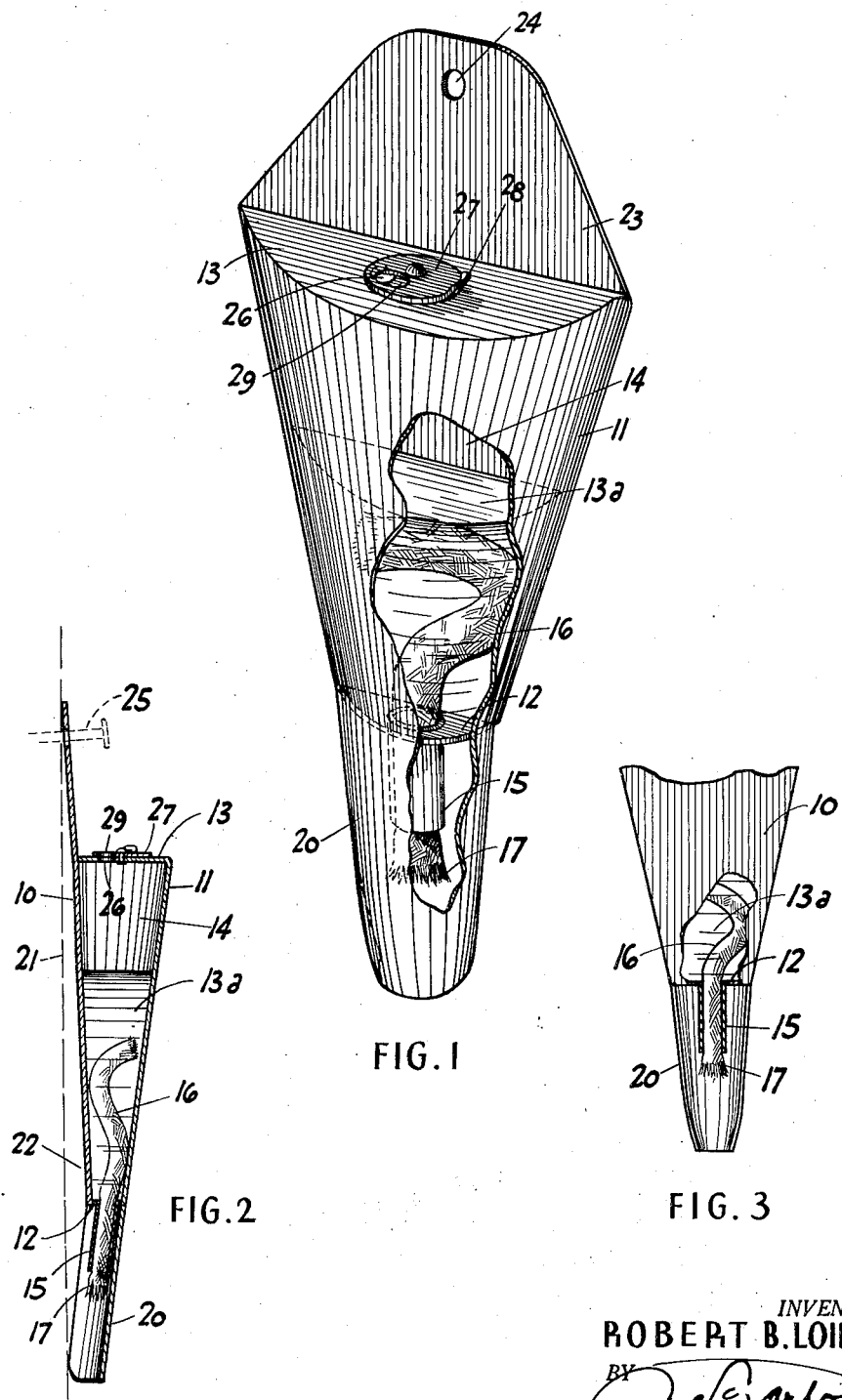

2,004,121

UNITED STATES PATENT OFFICE 2,004,121

PEST EXTERMINATOR

Robert B. Loibl, Jr., Los Angeles, Calif.

Application October 23, 1933, Serial No. 694,784

6 Claims. (Cl. 43—131)

This invention relates to a device for destroying annoying and injurious insects.

An object of the invention is to provide a reservoir for containing a liquid poison, in combination with improved means to gradually feed this poison to the insects to be exterminated thereby.

One advantage of the invention resides in the provision of a novel and improved means, not only for gradually delivering the poisonous liquid, but also to safeguard against the poison being partaken of by members of the animal kingdom other than those for which it is intended.

The invention may be embodied in various forms one of which is, by way of example, illustrated and described. The form shown is adapted for suspension from an upstanding support, such as a wall or tree.

Referring to the accompanying drawing, which illustrates the preferred form of the invention:

Fig. 1 is a perspective view showing the invention suspended from an upstanding support.

Fig. 2 is a vertical mid-section of the structure shown in Fig. 1.

Fig. 3 is a vertical mid-section of the lower portion of the device, the plane of section being at a right angle to that of Fig. 2.

Referring in detail to the drawing the invention comprises a casing having a flat rear wall 10 which tapers downwardly when the device is in its operative position, that is to say, is suspended from a suitable support, and having also a front wall 11, the latter wall being outwardly curved or convexed. The casing further includes a bottom wall 12 and a top wall 13. By these walls there is provided to contain liquid poison, a part conical reservoir 14 having a taper which diminishes from above downwardly.

The bottom of the reservoir 14 is provided with a liquid outlet tube 15 thereby forming a delivery passage through which extends a wick 16, a considerable portion of which desirably occupies the reservoir 14 in which is shown a poisonous liquid 13a. A portion of the wick also projects downwardly beyond the delivery tube 15, and it is this projecting portion 17 of the wick that delivers the liquid poison to the insects.

The volume of the seepage of the poisonous liquid oozing thru the wick from the reservoir is controlled by the length of the tube 15, the character of the wick 16 projecting therethru and the specific gravity of the syrupy liquid contained in the reservoir. Thus the delivery passage constitutes a gravity control valve for regulating the amount of "feed" passing from the reservoir for the insects.

In order to keep animal life other than insects from obtaining access to the poison, a means is provided for partially housing the projecting wick portion 17 within a recess provided therefor. For this purpose the convex front wall 11 of the casing is provided with a downward extension 20, thus forming a concavo-convex shield which overlies the projecting wick portion 17. As best shown in Fig. 2 the back side of this shield joins the back wall 10 of the casing at an obtuse angle. Therefore when the device is suspended from a wall or other upstanding support, indicated at 21, a vertically elongated opening 22 will be provided at each side of the device thus permitting insects to have free access to the poisonous liquid which moistens the projecting wick portion 17. The approximately semi-cylindrical shield 20 overlies only one side of the wick, leaving at its opposite side an open space for insects to enter and reach the poison.

In order to support the device the rear wall 10 is furnished with an upward extension 23 having a hole 24 therein to receive a suspending nail 25. Hence said extension 23 affords means to suspend the device upon a wall with a recessed part thereof directed toward the wall to form an entrance for insects.

The reservoir 14 is provided with a filling opening 26 which is closed by a rotatable cover plate 27 having an operating ear 28. Said plate 27 is provided with an opening 29 movable into and out of register with the filling opening 26.

It will be seen that in the invention a wick is provided to retard the flow of the liquid through the delivery passage or valve and that the projecting portion of the wick is provided with a shield which guards against the poison being partaken of except by the insects for which it is intended. Also, the recess provided behind the shield extends up to the bottom of the reservoir so that a feed passage may be provided leading through said bottom into said recess.

I claim:

1. In a device of the kind described, a casing having a reservoir to contain liquid poison, said reservoir having a liquid delivery passage, a wick extending through said passage to retard flow of the liquid therethrough, a portion of said wick projecting externally of said passage, and a shield overlying one side only of the projecting portion of said wick, there being a space at the opposite side of said wick to afford insects access thereto.

2. In a device of the kind described, a casing having a reservoir to contain liquid poison, said reservoir having a liquid delivery passage, a wick extending through said passage to retard the flow of the liquid therethrough, said casing having a projecting wall portion open at one side and which provides a recess with which said passage communicates into which said wick projects, and means to suspend said casing upon a wall with said recess directed theretoward.

3. In a device of the kind described, a casing shaped in the form of a downwardly tapering reservoir to contain liquid poison, there being a front inclined wall and a plate which provides a flat wall for said reservoir and which provides means for suspending the device upon a wall with the inclined wall thereof directed downwardly, there being a liquid delivery passage leading from the lower contracted end of the reservoir, a wick in part occupying said passage, a portion of said wick projecting downwardly from said passage, and a concavo-convex shield for said wick projecting from said casing, the aforesaid suspending means being arranged to support the device upon a wall with the concave side of said shield directed toward the wall.

4. In a device of the kind described, a casing in the form of a reservoir for poisonous liquid and having a front inclined wall and a flat rear wall which has an extension projecting beyond the top of the reservoir, said extension being provided with means to suspend the device upon an upstanding support, said casing having a transversely curved shield projecting below the reservoir and open on the wall side, there being a tube communicating with the lower part of said reservoir, and a wick extending through said tube, said wick having a projecting portion within the open space provided by said shield below the reservoir, the side edges of said shield being disposed at an obtuse angle to said casing to provide an entrance for insects at each side of the device when in operative position.

5. In a device of the kind described, a casing in the form of a reservoir for poisonous liquid and having a front inclined wall and a flat rear wall, said casing having a shield projecting below the reservoir and open on the wall side, there being a delivery passage communicating with the lower part of said reservoir, and a wick extending through said passage and projecting therebelow into the open space provided by said shield below the reservoir, said shield being disposed at an obtuse angle to said casing to provide an entrance for insects at each side of the device when in operative position.

6. In a device of the kind described, a casing having a reservoir to contain liquid poison, said casing having an approximately semi-cylindrical portion which is open at one side and projects beyond said reservoir and forms a recess, there being a liquid delivery passage to deliver liquid from said reservoir to a point within said recess, and a wick within said passage, a portion of said wick projecting from said passage into said recess and being covered at one side only by said projecting portion of the casing.

ROBERT B. LOIBL, Jr.